United States Patent [19]

Furman

[11] Patent Number: 5,465,295
[45] Date of Patent: Nov. 7, 1995

[54] CALLER DIRECTED ROUTING OF A TELEPHONE CALL BASED ON A DIALED SUFFIX

[75] Inventor: Daniel S. Furman, Maplewood, N.J.

[73] Assignee: AT&T IPM Corp., Coral Gables, Fla.

[21] Appl. No.: 360,182

[22] Filed: Dec. 20, 1994

Related U.S. Application Data

[63] Continuation of Ser. No. 998,168, Dec. 29, 1992, abandoned.

[51] Int. Cl.⁶ ................................................. H04M 3/42
[52] U.S. Cl. .......................... 379/211; 379/210; 379/201; 379/100; 379/207
[58] Field of Search ............................ 379/67, 89, 196, 379/207, 210, 211, 212, 216, 220, 221, 233

[56] References Cited

U.S. PATENT DOCUMENTS

| | | | |
|---|---|---|---|
| 4,313,035 | 1/1982 | Jordan et al. | 379/211 |
| 4,649,563 | 3/1987 | Riskin | 379/97 |
| 4,674,115 | 6/1987 | Kaleita et al. | 379/211 |
| 4,748,661 | 5/1988 | Edelstein et al. | 379/216 |
| 4,752,951 | 6/1988 | Konneker | 379/211 |
| 4,757,267 | 7/1988 | Riskin | 379/113 |
| 4,827,500 | 5/1989 | Binkerd et al. | 379/220 |
| 4,932,042 | 6/1990 | Baral et al. | 379/230 X |
| 5,018,191 | 5/1991 | Catron et al. | 379/100 |
| 5,033,079 | 7/1991 | Catron et al. | 379/100 |
| 5,099,511 | 3/1992 | Matsumoto | 379/233 X |
| 5,136,636 | 8/1992 | Wegrzynowicz | 379/97 X |
| 5,168,517 | 12/1992 | Waldman | 379/211 |
| 5,182,766 | 1/1993 | Garland | 379/216 |
| 5,187,735 | 2/1993 | Herrero Garcia et al. | 379/211 X |
| 5,193,110 | 3/1993 | Jones et al. | 379/233 X |
| 5,233,648 | 8/1993 | Nakamura | 379/233 |
| 5,239,577 | 8/1993 | Bates et al. | 379/196 |
| 5,311,586 | 5/1994 | Bogart et al. | 379/207 |
| 5,327,489 | 7/1994 | Anderson et al. | 379/94 X |
| 5,329,589 | 7/1994 | Fraser et al. | 379/93 X |

FOREIGN PATENT DOCUMENTS

| 531268 | 10/1993 | European Pat. Off. . |
|---|---|---|
| 9111874 | 8/1991 | WIPO . |

Primary Examiner—Jeffery A. Hofsass
Assistant Examiner—Daniel S. Hunter
Attorney, Agent, or Firm—Frederick B. Luludis

[57] ABSTRACT

The routing of telephone calls in a telecommunications network is enhanced by providing a method for associating a plurality of telephone numbers assigned to a particular subscriber with respective codes such that a caller may dial one of the subscriber's telephone numbers and a code associated with another one of the subscriber's telephone number in order to direct the routing of the call to the latter telephone number.

14 Claims, 4 Drawing Sheets

CALLER DIRECTED ROUTING OF A TELEPHONE CALL BASED ON A DIALED SUFFIX

This application is a continuation of application Ser. No. 07/998,168, filed on Dec. 29, 1992, now abandoned.

FIELD OF THE INVENTION

The invention relates to controlling the routing of a telephone call.

1. Background of the Invention

Presently, it is not uncommon for a subscriber to be associated with a number of different telephone numbers. For example, a telephone subscriber may have a home telephone number, business telephone number and a telephone number associated with a facsimile machine. Moreover, the telephone subscriber may have still another telephone number associated with a (voice or electronic) mail service. Disadvantageously, we have reached a point where people have to either memorize or maintain a personal directory of all of the telephone numbers assigned to others.

2. Summary of the Invention

I have recognized that the problem of memorizing all of the telephone numbers assigned to a particular telephone subscriber may be readily overcome by providing a facility which, in accordance with the invention, processes a telephone call based on a dialed code, illustratively a suffix, accompanying a dialed telephone number. Advantageously, then, a caller may specify particular routing for a call based on dialing a predetermined suffix in which the routing is independent of the dialed telephone number. Accordingly, a person need only remember a particular one of a plurality of telephone numbers associated with another person, but may still place a call to any one of these numbers by dialing the particular telephone and a particular suffix code. For example, a caller may place a call to a FAX machine associated with a called party by dialing that party's home telephone number and then dialing a particular suffix, e.g., *F#. The network, in response to the dialed suffix, establishes a connection to the called party's FAX machine, rather than to the called party's home telephone number. If, on the other hand, the caller dials a different suffix, e.g., *M#, then the network connects the caller to an electronic messaging service associated with the called party.

In a preferred embodiment of the invention, a subscriber's associated telephone numbers and respective codes are stored as a list in a centralized database, such as, e.g., a network control point. Accordingly, a network element such as a toll switch responsive to receipt of a telephone number accompanied by a respective code sends, inter alia, the received number and code to the database for translation. The database, in turn, locates the associated list of telephone numbers and, in a conventional manner, translates the received telephone number into the telephone number associated with the received code. The database then returns the translated telephone to the network element. The network element, in turn, forwards the call to a telephone station set identified by the translated telephone number.

DETAILED DESCRIPTION

Figure 1:
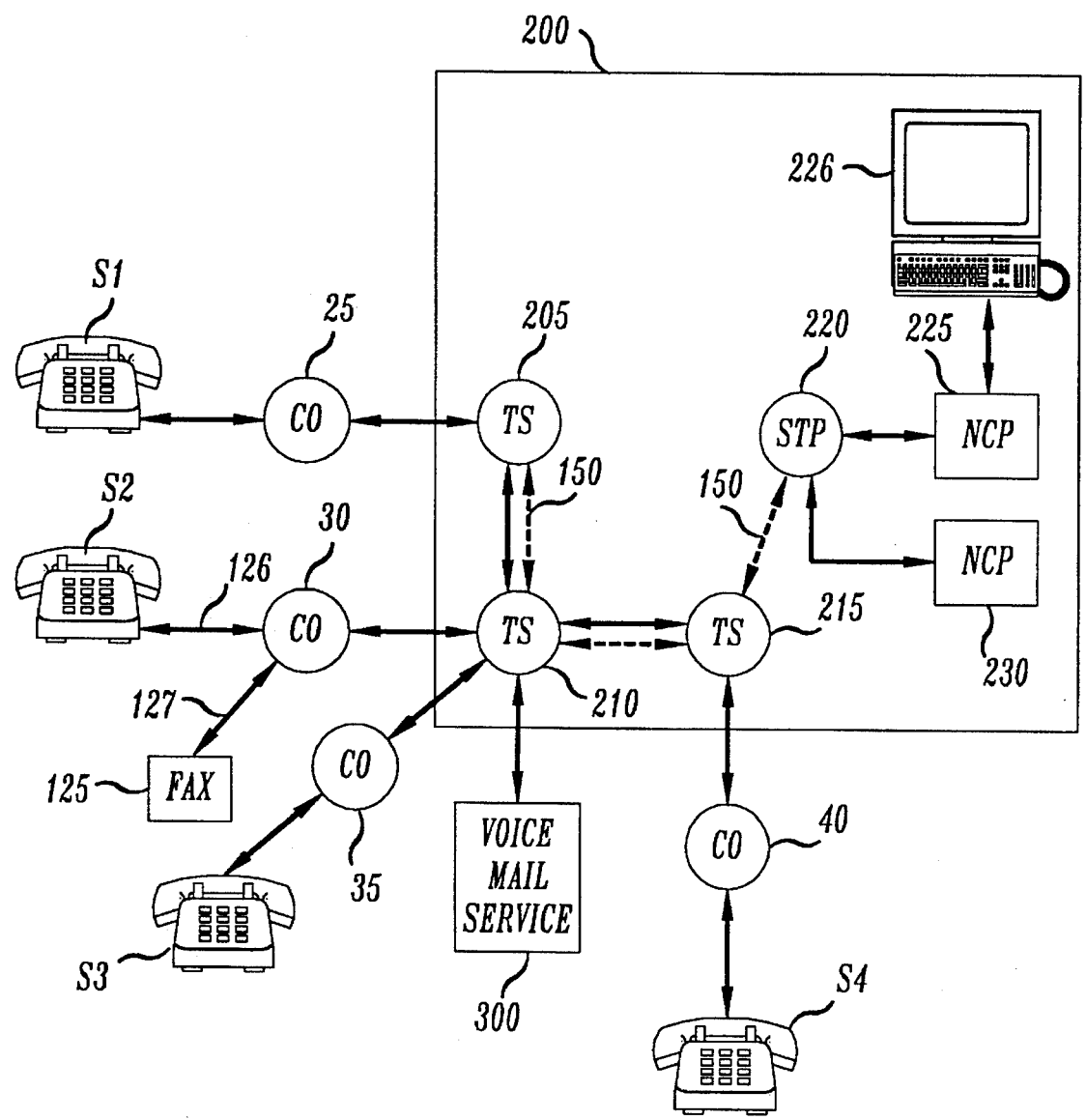
FIG. 1 shows in block diagram form a telecommunications network in which the principles of the invention may be practiced.

Turning now to FIG. 1, there is shown telecommunications network 200, which may be, for example, the AT&T public switched network, that provides a number of different calling services for its subscribers, e.g., the subscribers associated with stations S1 and S2.

Network 200 includes, inter alia, a plurality of interconnected Toll Switching (TS) offices, three of which are shown in the FIG., namely TS 205, 210 and 215. Such toll switches may be any one of a number of different well-known types of switching equipments, such as, for example, the No. 4ESS (Electronic Switching System) commercially available from AT&T. Such toll switches are also interconnected via data link 150, which may be a part of, for example, the well-known Common Channel Signaling network (CCS). The toll switches exchange data messages with one another via CCS network 150 in order to establish a telephone connection from an originating toll switch to a destination toll switch.

Each toll switch, e.g., TS 205, is also connected to one of a plurality of Central Offices (CO), such as CO 25. A CO is arranged to connect a calling telephone station (e.g., S1) which has dialed a particular telephone number outside of the calling area served by the CO to an associated toll switch, e.g., TS 205. A CO is also arranged to connect calls that it receives from an associated toll switch (destination switch) to a called station, e.g., station S2.

Network 200 further includes a number of centralized databases commonly referred to as Network Control Points (NCPs), which are commercially available from AT&T, and which support the provision of various network 200 services, such as enhanced dialing, which is an object of the claimed invention. Such NCPs, for example, NCPs 225 and 230, are positioned at various locations within network 200 and are interconnected with the toll switches via CCS network 150 and various signal transfer points, such as Signal Transfer Point (STP) 220.

Assume at this point that the subscriber associated with a home telephone station set S2 is also associated with facsimile machine 125 and business telephone station set S3. In that case then, the station S2 subscriber would be associated with three telephone numbers respectively assigned to station sets S2 and S3 and facsimile machine 125. Accordingly, an acquaintance or business associate of the station S2 subscriber would have to remember or record in a directory such telephone numbers to contact the station S2 subscriber at either station S2 or S3 or send a facsimile thereto. Moreover, in the latter case, a person who doesn't know the station S2 subscriber's "FAX" number but desiring to send a facsimile thereto would be presented with the problem of determining the latter number, since a telephone number associated with a facsimile machine is typically not listed as such in a telephone directory. However, the telephone directory would list (with the subscriber's permission) the telephone numbers associated with telephone lines 126 and 127. In that case, a person could attempt to send a FAX by dialing the telephone number associated with line 126 and, if that fails, send the FAX by dialing the number associated with line 127.

I have recognized that a person who is associated with a plurality of telephone numbers may, in accord with the invention, consolidate such numbers into just one telephone number and distinguish the telephone numbers from one another by a suffix, or code. Such consolidation is referred to herein as an enhanced dialing service, which allows a caller to control the routing of a call placed to a subscriber of the enhanced dialing service by entering a predetermined suffix following the entry of a root, or base, telephone number, in which the suffix indirectly identifies that one of the subscriber's plurality of telephone numbers that the caller desires to reach. Moreover, each such suffix code may be defined, in accord with an aspect of the invention, by a subscriber of inventive service.

Figure 2:
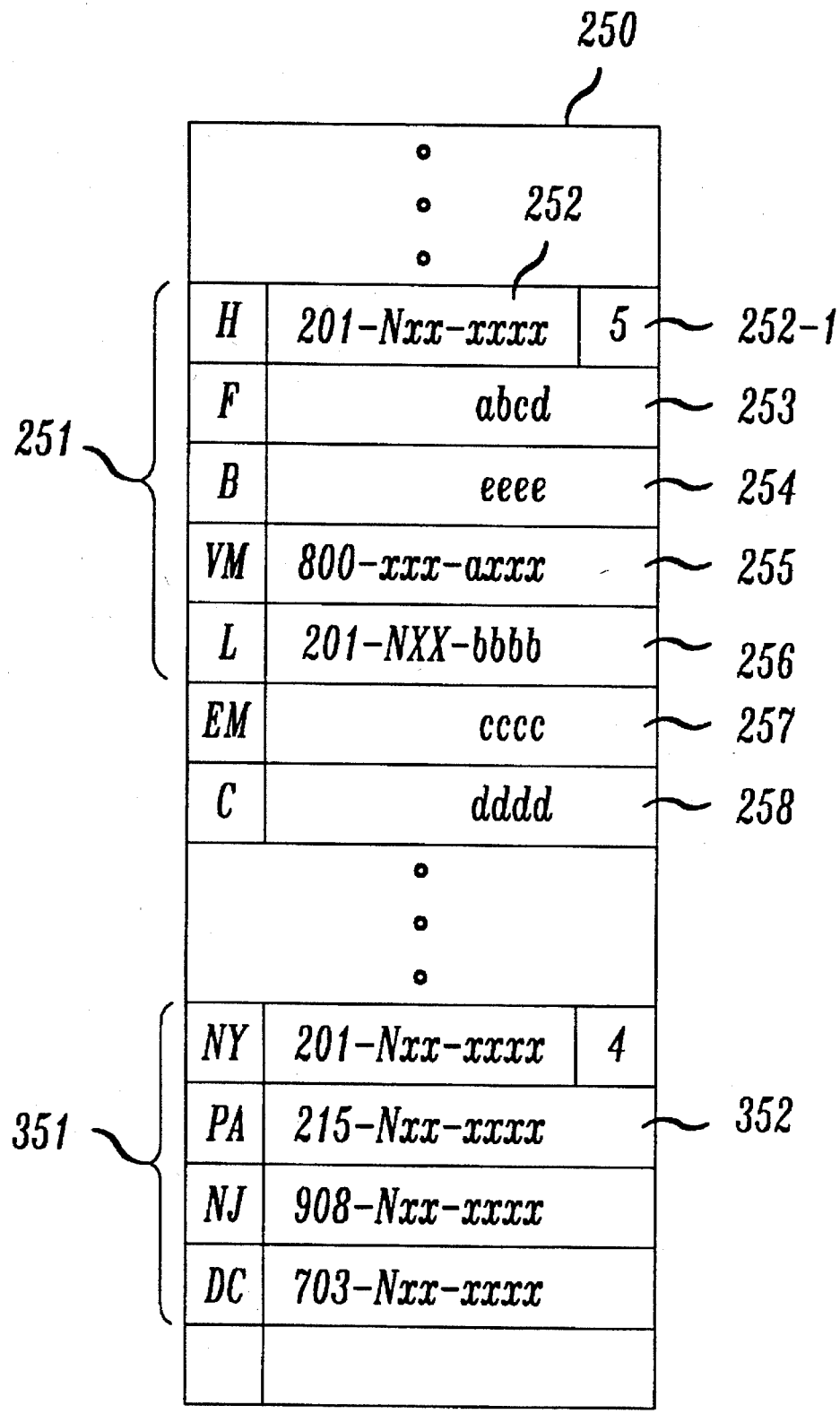
FIG. 2 is an illustrative example of a subscriber record that implements the invention in a Network Control Point (NCP) of FIG. 1.

Specifically, assuming that the station S2 subscriber also subscribes to the network 200 enhanced dialing service, then a service record for that subscriber is stored in a table with other such records in the memory of one of the network 200 NCPs, e.g., NCP 225. Such a record includes an entry for each telephone number specified by the subscriber and a suffix code in which the first of such entries contains the root telephone number that is also specified by the subscriber. The root entry may also contain a value identifying the number of entries in the record. An example of such a record is shown in FIG. 2, which assumes that the first entry in subscriber record 251, i.e., the root entry 252, is the station S2 telephone number. (It is noted that each of the letters N, x, a, b, c, d, etc., shown in FIG. 2, is taken to mean herein a particular number, or digit, and that a series of such letters form a respective telephone number.)

The remaining entries forming record 251 of table 250 contain other telephone numbers associated with the station S2 subscriber. Entry 253, more particularly, contains the telephone number assigned to line 127 connected to the subscriber's facsimile machine 125 (FIG. 1) and entry 254 is the telephone number of station S3, which is assumed to be the subscriber's business telephone number. It is also assumed that the station set S2 subscriber is a subscriber of voice mail service 300 (FIG. 1), whose telephone number is stored in entry 255. The enhanced dialing service may also be used in accord with an aspect of the invention, to implement a conventional personal locator service similar to the service disclosed in U.S. Pat. No. 4,313,035 issued on Jan. 26, 1982 to D. S. Jordan et al, which is hereby incorporated by reference.

It is seen from the FIG. that each telephone number entry forming record 251 also contains a particular suffix code. For example, entries 252 through 256 respectively contain the codes "H", or the digit 4, for home, F" for FAX (digits 3, 2 and 9), "B" (digit 2) for business, "VM" (digits 8 and 6) for voice mail, and "L" (digit 5) for the aforementioned locator service. Accordingly, callers need only remember the station S2 telephone number and may reach the station S2 subscriber at one of a number of other telephone numbers associated therewith.

Specifically, if the station S1 subscriber desires to send a facsimile to the station S2 subscriber, then the station S1 subscriber may do so by establishing a direct access path to network 200. Such a path may be established by, for example, dialing a so-called Group D interexchange access code, e.g., 01228#. Such a code causes CO 25 to establish a connection between station S1 and network 200, in which the connection terminates at an idle incoming trunk of the Group D trunk group contained in TS 205 (FIG. 1). After dialing the access code, the station S1 subscriber then dials the station S2 telephone number (201-NXX-XXXX) followed by the desired suffix identifying facsimile service, i.e., *F#. More particularly, and referring to FIGS. 1 and 2, TS 205, responsive to an incoming trunk of its interexchange access trunk group being seized, connects a receiver circuit to the incoming trunk to collect the digits forming the telephone number dialed by the station S1 subscriber and the digits forming a suffix, if any. If a suffix is not received, then TS 205 processes the call in a conventional manner. However, if TS 205 receives a suffix, then it recognizes receipt of the suffix as being a request for the enhanced dialing service. In line therewith, TS 205 forms a message containing the received telephone number and suffix and then sends the message to the appropriate NCP, e.g., NCP 225, via CCS network 150 and STP 220.

Upon receipt of the message, NCP 225, in a conventional fashion translates the telephone number contained in the message into a table 250 address. If the results of the translation produces an address that is not within the range of addresses specified for table 250, then NCP 225 returns an error message to TS 205. TS 205, in turn, transmits an error signal over its seized incoming trunk and then terminates the call by placing the trunk in an on-hook state. If, on the other hand, the translation produces a valid table 250 address, then NCP 225 accesses the associated record 251 and compares the suffix contained in the received message with each suffix contained in record 251. In the present illustrative example, NCP 225 will find that the received suffix compares with the suffix code contained in entry 253 and, therefore, unloads the contents of that entry. NCP 225 then forms a message containing such contents and sends the message to TS 205 via CCS 150.

Upon receipt of the NCP 225 message, TS 205 in a conventional manner forwards the telephone call via TS 210 and CO 30 to the destination associated with the telephone number (i.e., abcd) contained in the NCP 225 message. In the present example, that destination is facsimile machine 125. Thus, in accordance with the invention, the station set S1 caller dials a first, or root, telephone number, and then enters a suffix, to direct the routing of the telephone call to another telephone number. Advantageously, then, the caller only needs to know the root (or home) telephone number associated with the subscriber, but still can reach the subscriber at other telephone numbers that may be unknown to the caller.

As a further example, if the station S1 caller enters *B# as a suffix, rather than *F#, then the NCP 225 message contains the telephone number associated with that suffix, namely, eeee (i.e., entry 254 of table 251). In that case, then, TS 205 forwards the station set S1 call to station set S3, which is assumed to be the subscriber's business telephone station set, as mentioned above.

If, on the other hand, the station S1 caller enters *VM# as a suffix, then the NCP 225 message contains the telephone number associated with that suffix, namely, 800-xxx-axxxx. As mentioned above, the latter number is associated with conventional voice mail service 300. Accordingly, TS 205, responsive to receipt of the NCP 225 message, forwards the call and root telephone number to service 300. Service 300, responsive to receipt of the call and latter telephone number, accepts entry of the caller's voice message and stores the voice message at a memory location indirectly related to to the received telephone number. Thereafter, the station S2 subscriber may place a call to service 300, enter an associated account code and access the voice message. Similarly, if the subscriber is associated with an Electronic Mail (EM)

service, and the caller wishes to send EM to the subscriber, then the caller may do so by dialing the root telephone number and suffix EM. Assuming that entry 257 is contained in record 251, then the NCP 225 message contains the telephone number, or information, "cccc" associated with that suffix, where cccc is taken to mean the telephone number of the subscriber's electronic mail service and electronic mail address. Responsive to receipt of the message, TS 205 establishes a connection to the electronic mail service and enters the subscriber's electronic mail address.

As mentioned above, the claimed invention is readily adaptable for implementing a subscriber locater service that is based on a call forwarding functionality, in which the functionality is associated with a particular suffix, e.g., *L#. More particularly, the station S2 subscriber may invoke that functionality by placing a call to an attendant positioned at console 226 associated with NCP 225. When the attendant answers the call, the subscriber may then request locator service by identifying a call forwarding telephone number that is to be associated with the latter suffix. The attendant, in turn, and in communications with an NCP 225 processor, causes the subscriber's enhanced dialing service record to be displayed on the console 226 display. The attendant then overwrites telephone number entry 256 of the displayed record with the new call forwarding telephone and then enters a request to store the record in table 250.

Assume that the call forwarding number that is stored as entry 256 is 908-NXX-bbbb and is associated with station set S4. Accordingly, then, if the station S1 caller enters *L# as the suffix code, then the NCP 225 message will contain the latter telephone number as a result of the aforementioned translation involving record 251. TS 205, in response to receipt of the NCP 225 message, translates the latter telephone number into a routing code identifying TS 215, and routes the call thereto. TS 215, in turn, forwards the call to station S4 via CO 40, thereby effecting the call forwarding functionality.

As another example, assume that the station set S2 subscriber is associated with a cellular (C), or mobile, telephone service. As is well-known, the cellular subscriber pays for the so-called "air time" on calls originating from or received at the subscriber's cellular telephone. Because the cellular telephone user pays for such "air time" on received calls, the user is reluctant to "give" his/her cellular telephone number to persons other than particular business associates and family members. I have recognized that enhanced dialing could be used to associate a subscriber's root telephone number with the subscriber's cellular telephone number with the condition that if a caller uses a suffix to place a call to the subscriber's cellular telephone then the caller pays for the call as well as the so-called "air time". However, the suffix associating a cellular telephone number with a root telephone number needs to be standardized so that an NCP, e.g., NCP 225, recognizes that suffix and notifies the requesting toll switch to "bill" the caller for all costs and charges associated with the cellular telephone call, including the so-called "air time".

Accordingly, assume that entry 258 is contained in record 251 and that suffix "C" is a suffix standardized across telephone systems to associate a root telephone number with a cellular telephone. Also assume that the station set S1 caller enters *C# as a suffix. As such, NCP 225 translates that suffix and root telephone number into entry 258 and forms a message containing the telephone number associated with that suffix. In addition, NCP 225 recognizes that suffix "C" is the standardized suffix for cellular phone service, and, therefore, includes in the message instructions to "bill" all charges for the call to the calling party. NCP 225 then sends the message to TS 205. TS 205 responsive to receipt of the NCP 225 message forwards the call to a destination that is connected to the subscriber's cellular phone service and prepares a billing record to track the costs and charges associated with the call and associates the billing record with the calling party's telephone number so that the cellular "air time" is charged to the calling party, rather than to the called cellular telephone number.

FIG. 2 also shows an example of a translation record 351 assigned to a business customer having a number of business locations respectively located in New York (NY), Pennsylvania (PA), New Jersey (NJ) and the District of Columbia (DC). In record 351, the suffix codes specify respective ones of those locations. For example, the suffix code for entry 352 is PA. Thus, a caller who dials the root telephone number (New York location) and then dials a suffix code of PA is connected to the business customer's Pennsylvania location. Alternatively, the business customer could have locations in a number of different countries. In that instance, a suffix code could specify one of those countries, in which the root telephone number could be the business customer's U.S. location.

Figure 3:
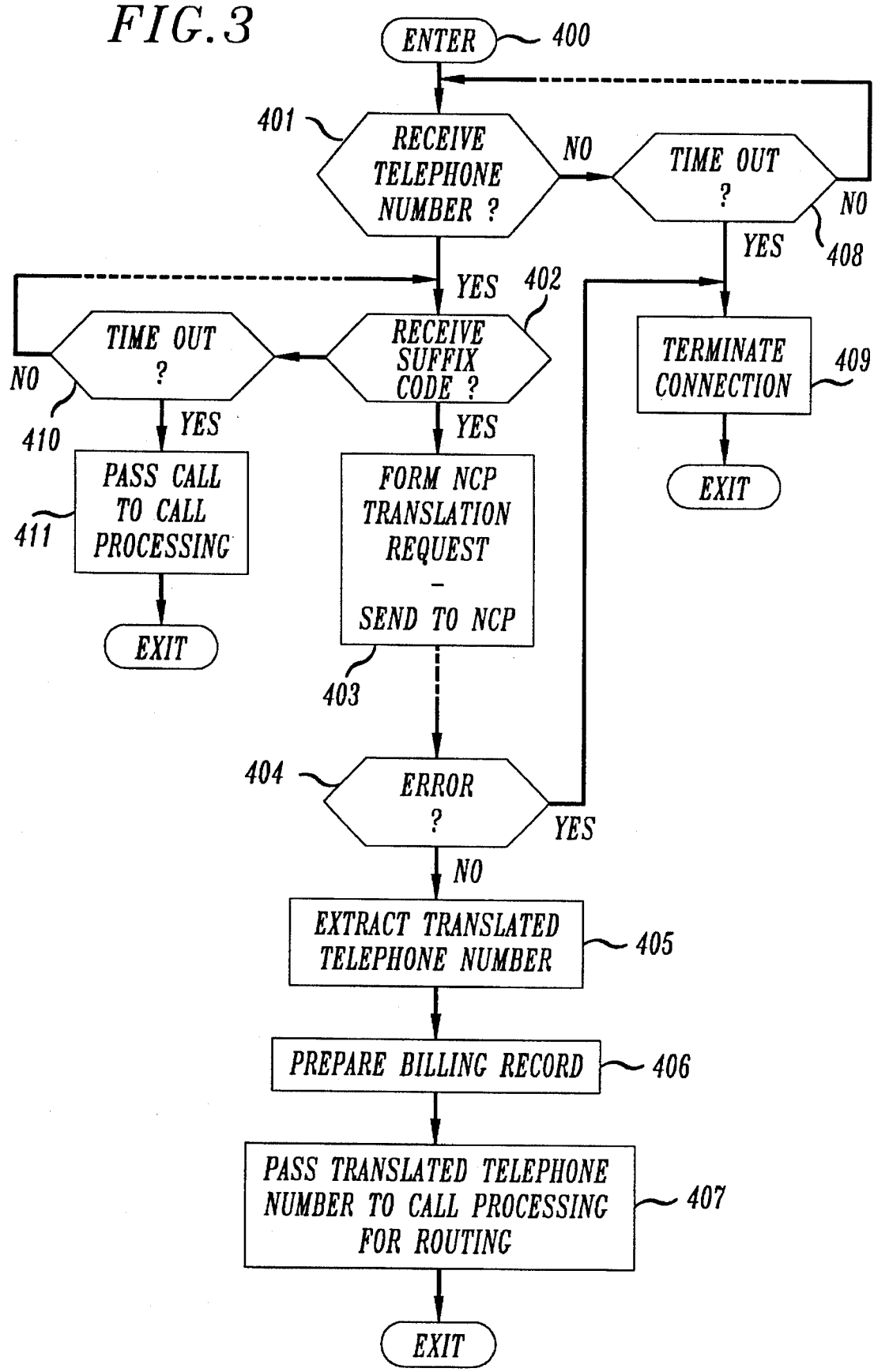
FIG. 3 shows in block diagram form the program which implements the invention in a toll switch of FIG. 1.

Turning now to FIG. 3, the program which implements the invention in a toll switch, e.g., TS 205, is entered at block 400 responsive to receipt of an incoming call via the aforementioned Group D trunk group. At block 400, the program proceeds to block 401 where it enters a timed loop, e.g., 20 seconds, to wait for the receipt of a calling telephone number. If the telephone number is received before the wait period expires then the program exits the loop and proceeds to block 402. Otherwise, the program proceeds to block 408 where it checks a conventional software clock (started at block 400) to determine if the wait period has expired. If it has, then the program proceeds to block 409 where it causes the incoming call to be terminated in a conventional manner, that is, by causing the incoming trunk receiving the call to be placed in an on-hook state. If the wait period has not expired, then the program exits and is thereafter reentered at block 401 on a timed basis, e.g., 100 milliseconds, as represented by the dashed loop-back line from block 408 to block 401.

At block 402, the program checks to see if an associated suffix code has been received. If it has, then the program proceeds to block 403. If it has not, then the program proceeds to block 410 where it enters a timed loop, e.g., 2 seconds, to wait for the possible receipt of the suffix code. The timed loop comprising the block 402 "no" path and the block 410 "no" path to block 402 operates similar to the timed loop implemented by blocks 401 and 409. If, at block 410, the program finds that the suffix wait period has expired, then the program proceeds to block 411 where it passes the call to a conventional call processing program and then exits.

At block 403, the program formats, inter alia, the received telephone number, associated suffix code and translation request into a conventional CCS message and causes the message to be sent to NCP 225 via the CCS network. The program then waits for the NCP response (represented by the dashed line between blocks 403 and 404) and proceeds to block 404 upon receipt thereof. At block 404, the program checks to see if the NCP response is an error message and proceeds to block 409 to terminate the call if it finds that to be case. Otherwise, the program proceeds to block 405 where it extracts the translated telephone number corresponding with the received suffix. At block 406, the program creates a conventional billing record using the root, or received telephone number, translated telephone number, calling telephone number (i.e., so-called ANI) and time of day. The program at block 406 then passes the billing record and translated telephone number to the call processing program so that the call may be routed to its intended destination. The program then exits.

Figure 4:
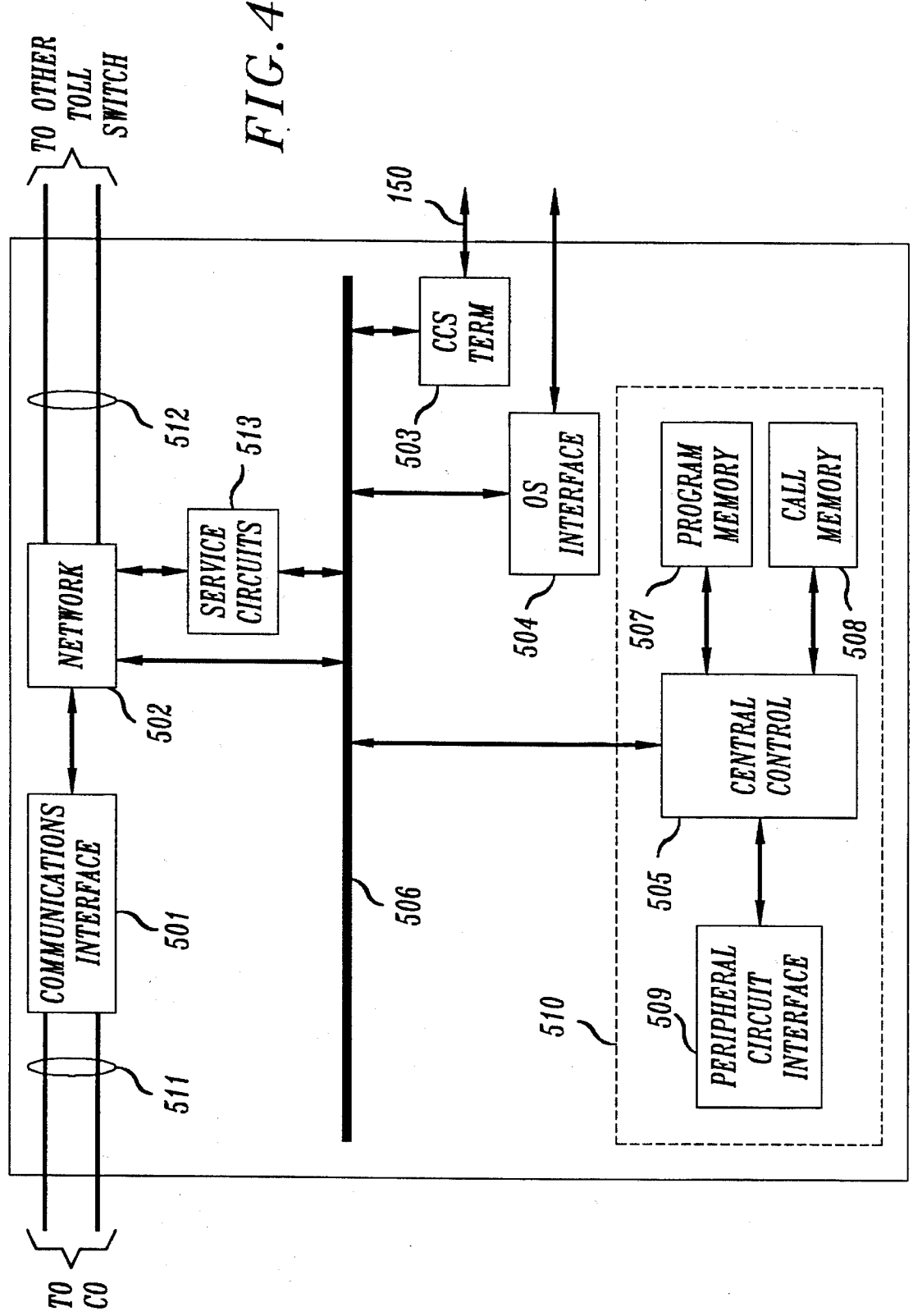
FIG. 4 is a broad block diagram of a toll switch of FIG. 1.

Turning now to FIG. 4, there is shown a broad block diagram of a network 200 toll switch, e.g., switch 205, in which the principles of the invention may be implemented. Specifically, a toll switch includes (a) CPU 510, which controls the overall operation of the switch; (b) digital network 502, which is the mechanism by which an incoming call received via a respective one of network links (trunks) is presented to another network 200 switch via a respective one of intertoll links 512; (c) communications interface 501, which interfaces a network link, and hence telephone calls, with the network switch; (d) CCS terminal 503, which interfaces CCS network 150 with CPU 510 via common bus 506, and (e) a group of service circuits 513 including MF receivers and transmitters. CPU 510 includes, inter alia, (a) central control 505, program and call memories 507 and 508, and (c) peripheral circuit interface 509 for interfacing a master control console (not shown) with central control 505. The program (FIG. 3) which implements the invention as well as other programs are stored in memory 507, whereas associated traffic data, billing records, translation tables, etc., are stored in call memory 508.

The foregoing is merely illustrative of the principles of the invention. Those skilled in the art will be able to devise numerous arrangements, which, although not explicitly shown or described herein, nevertheless embody those principles that are within the spirit and scope of the invention. For example, the aforementioned direct access path could be established in a number of other ways, such as by using a bypass connection between a station set and network 200, or by dialing a predetermined service number which causes a connection to be established between the calling calling party and a network 200 toll switch via a CO. The toll switch, responsive to receipt of that service number, may then prompt the calling party to enter a called root number and suffix, or code. Alternatively, the invention may be implemented at a CO, thereby eliminating the need of having to establish a direct access connection between a subscriber station set and network 200. As a further example, a number of different telephone numbers associated with a particular subscriber could serve concurrently as a root telephone number. In that sense then, a person who only knows one of the root numbers may still access the subscriber's other telephone numbers. For example, if the subscriber designates FAX and home telephone numbers as root numbers, then a caller may dial the FAX telephone number and suffix *H# to place a call to the subscriber's home telephone number, or vice versa. As another example, a caller may enter a suffix code after a call connection has been established, thereby allowing the caller to redirect a call from one location to another location. In particular, there is a chance that interexchange networks, e.g., network 100, will deploy an echo canceler in each intertoll trunk (e.g., 512, FIG. 4) as a way of eliminating so-called echo in each call connection. Advantageously, such an echo canceler may be readily adapted to include an multifrequency receiver. Accordingly, if a caller enters a code during a call, then the code will be detected by the receiver in the echo canceler contained in the associated intertoll connection. The detected code can then be passed to the associated central control 505 (FIG. 4) for processing. That is, the detected code may be translated in the manner described above and then the call may be redirected to another telephone station set based on the translated telephone number. Alternatively, the entered code may be translated into an identifier identifying a particular network function, e.g., a request for a conference call.

I claim:

1. A method of processing a telephone call in a public telecommunications system comprising a plurality of interconnected switches, said method comprising the steps of responsive to receipt of said telephone call at an originating one of said switches, receiving a sequence of telephone keypad digits associated with said telephone call, in which said sequence of telephone keypad digits represents a caller dialed telephone number and suffix code, said suffix code immediately following said telephone number and being distinguishable from said telephone number, translating said received dialed telephone number and said received suffix into another telephone number, and forwarding the telephone call to a destination identified by the other telephone number.

2. The method set forth in claim 1 wherein said code includes at least one dialed non-numeric character and at least one dialed digit, and wherein said method further comprises the step of using said at least one character to distinguish said code from said telephone number and using said at least one dialed digit to associate said other telephone number with said dialed number.

3. The method set forth in claim 2 wherein said non-numeric character is a star (*) sign or a pound (#) sign.

4. The method set forth in claim 1 further comprising the steps of storing said dialed telephone number as a root telephone number in a list of telephone numbers and associating other telephone numbers in said list with said root telephone number as a function of respective codes such that said other telephone number and said dialed code form one entry in said list.

5. The method set forth in claim 4 further comprising the step of arranging at least one other entry in said list so that said one other entry implements a call forwarding functionality.

6. The method set forth in claim 5 further comprising the step of partitioning said one other entry into first and second fields, said first field containing a call forwarding telephone number and said second field containing a predetermined locator code operative for associating said received telephone number with said call forwarding number.

7. The method set forth in claim 1 wherein said received code is a standardized code associating said other telephone number with said dialed telephone number.

8. The method set forth in claim 6 wherein said other telephone number is a cellular telephone number.

9. The method set forth in claim 1 wherein said other telephone number is associated with a voice mail service and wherein said step of forwarding includes the step of forwarding the telephone call to the voice mail service identified by the other telephone number, rather than to the dialed telephone number.

10. A method of routing a telephone call in a public telecommunications system, said method comprising the steps of receiving from a caller a sequence of dialed digits representing a dialed telephone number and a suffix code distinguishable from said telephone number by a delimiter interposed between said telephone number and said suffix, identifying one of a plurality of stored lists of telephone numbers as a function of said received telephone number and selecting one of said telephone numbers from said one list as a function of said suffix code, and forwarding said telephone call to a destination identified by said one telephone number.

11. The method set forth in claim 10 further comprising the steps of storing said received telephone number in said list as a root telephone number, and associating other telephone numbers in said list with said root telephone number as functions of respective codes.

12. The method set forth in claim 10 further comprising the step of arranging at least one entry in said list so that said at least one entry implements a call forwarding functionality.

13. The method set forth in claim 12 further comprising the step of partitioning said at least one entry into at least first and second fields, said first field containing a call forwarding number and said second field containing a predetermined locator code operative for associating said received telephone number with said call forwarding number.

14. A method of routing a telephone call in a public telecommunications system formed from a plurality of switching equipments, said method comprising the steps of creating at least one database common to said switching equipments and storing a plurality of lists of telephone numbers in said one database, said lists being associated with respective telephone numbers, associating each of the telephone numbers in a list with a respective code, responding, at one of said switching equipments, to receipt of a telephone call associated with a called telephone number and a respective code entered by a caller by sending said called telephone number and said code to said one database, said entered telephone number and said respective code being separated from one another by a predetermined delimiter, and arranging said one database so that it (a) identifies the associated one of said lists as a function of the called telephone number, (b) reads from the associated one of said lists a telephone number associated with the received code and (c) sends the read telephone number to said one switching equipments so that said one switching equipment may forward said call to a destination identified by said read telephone number.

\* \* \* \* \*